US012747972B2

(12) United States Patent
Dasgupta

(10) Patent No.: US 12,747,972 B2
(45) Date of Patent: Sep. 29, 2026

(54) METHOD AND SYSTEM FOR OPERATING AN ELECTROMAGNETIC FLOWMETER FOR IMPROVING MEASUREMENTS DURING FLOW DISTORTION

(71) Applicant: ABB Schweiz AG, Baden (CH)

(72) Inventor: Subhashish Dasgupta, Bangalore (IN)

(73) Assignee: ABB Schweiz AG, Baden (CH)

( * ) Notice: Subject to any disclaimer, the term of this patent is extended or adjusted under 35 U.S.C. 154(b) by 261 days.

(21) Appl. No.: 18/333,623

(22) Filed: Jun. 13, 2023

(65) Prior Publication Data

US 2023/0314194 A1 Oct. 5, 2023

Related U.S. Application Data

(63) Continuation of application No. PCT/IB2021/059163, filed on Oct. 6, 2021.

(30) Foreign Application Priority Data

Dec. 14, 2020 (IN) ............................ 202041054364

(51) Int. Cl.
*G01F 1/58* (2006.01)

(52) U.S. Cl.
CPC .............. *G01F 1/586* (2013.01); *G01F 1/584* (2013.01)

(58) Field of Classification Search
CPC .................................................. G01F 1/58–60
See application file for complete search history.

(56) References Cited

U.S. PATENT DOCUMENTS

| | | | | |
|---|---|---|---|---|
| 5,325,724 | A | 7/1994 | Kiene et al. | |
| 6,634,238 | B2 * | 10/2003 | Budmiger | G01F 1/60 73/861.12 |
| 9,027,418 | B2 | 5/2015 | Smith et al. | |
| 2010/0107776 | A1 | 5/2010 | Shanahan | |

(Continued)

FOREIGN PATENT DOCUMENTS

| | | | |
|---|---|---|---|
| IN | 201841040896 | A | 5/2020 |
| KR | 10-1595529 | B1 | 2/2016 |
| WO | WO 2018/207009 | A1 | 11/2018 |

(Continued)

OTHER PUBLICATIONS

European Patent Office, International Search Report in International Patent Application No. PCT/IB2021/059163, 4 pp. (Jan. 28, 2022).

(Continued)

*Primary Examiner* — Justin N Olamit
(74) *Attorney, Agent, or Firm* — Fitch Even Tabin & Flannery LLP

(57) ABSTRACT

An Electromagnetic (EM) flowmeter includes pair of coils powered by currents for generating electromagnetic fields, and pair of electrodes for measuring electromotive forces generated by interaction of electromagnetic and flow fields in fluid. To improve measurements during flow distortion, a system configures current in the pair of coils based on a relation between a distance of the EM flowmeter from flow distorting features in the flow pipe and the characteristic length of the EM flowmeter. Further, based on configuration of current in the pair of coils, signals are generated due to electromotive forces and are measured to estimate flow in the pipe.

10 Claims, 5 Drawing Sheets

(56) References Cited

U.S. PATENT DOCUMENTS

2017/0322060 A1 * 11/2017 Sakata .................... G01F 1/588

FOREIGN PATENT DOCUMENTS

WO WO 2020/089765 A1 5/2020
WO WO 2020/126241 A1 6/2020

OTHER PUBLICATIONS

European Patent Office, Written Opinion in International Patent Application No. PCT/IB2021/059163, 7 pp. (Jan. 28, 2022).
European Patent Office, Office Action in European Patent Application No. 21805602.6, 6 pp. (Feb. 7, 2025).
Intellectual Property India, First Examination Report in Indian Patent Application No. 202041054364, 5 pp. (Jun. 24, 2022).

* cited by examiner

METHOD AND SYSTEM FOR OPERATING AN ELECTROMAGNETIC FLOWMETER FOR IMPROVING MEASUREMENTS DURING FLOW DISTORTION

CROSS-REFERENCE TO RELATED APPLICATIONS

The instant application claims priority to International Patent Application No. PCT/IB2021/059163, filed Oct. 6, 2021, and to Indian Patent Application No. 202041054364, filed on Dec. 14, 2020, each of which is incorporated herein in its entirety by reference.

FIELD OF THE DISCLOSURE

The present disclosure generally relates to an electromagnetic (EM) flowmeter, and more particularly relates to the electromagnetic flowmeter that is operated for improving measurements during flow distortion of fluid in a flow pipe.

BACKGROUND OF THE INVENTION

Electromagnetic (EM) flowmeters are devices used for measuring flowrate of a fluid. The EM flowmeters are applicable for all conductive liquids, such as water, acids, alkalis, slurries, and many others. Generally, the EM are non-invasive and have no moving parts, reducing a risk of breakdowns and frequency of repairs. However, a cause of concern in functioning of electromagnetic flowmeters is in field due to degradation in measurement accuracy due to flow distortion or velocity profile distortion by upstream features (or piping disturbances), such as, but not limited to, bends, valves, elbows, and T-junctions.

Thus, like in many other flow sensors, measurement accuracy of electromagnetic flowmeters could suffer due to the presence of an upstream flow distorting feature like bends. In existing systems, many techniques have been implemented to mitigate errors induced in flowrate readings due to flow distortion effects. For instance, while conditioning flow prior to its entry into flowmeter section, has been a successful method, the method results in pressure drop, calls for changes in the flowmeter cross section and/or usage of additional components. An extreme situation commonly encountered in the field is availability of not more than zero-to-one-time pipe diameter distance from an upstream bend for installing the flowmeter. Reforming the flow by using a flow reformer like a perforated plate at the flowmeter inlet induces high pressure drop and is not a feasible method.

Also, non-invasive methods to overcome flow distortion effects have been tested and implemented. However, these methods involve additional components and call for undesirable changes to hardware of the EM. Multiple electrodes can be used to obtain several sets of readings at various levels within the flowmeter pipe and averaging the readings to overcome flow distortion effects. However, the method exposes the flowmeter to higher chances of leakage and incurs additional hardware requirements with associated higher costs. Extended electrodes can be used to obtain a flow-average reading but are prone to other noise issues like particulate bombardment on the electrode surfaces.

Consequently, the flow distortion or the velocity profile distortion of the fluid affect accuracy of the flowrate measurement of the fluid. However, measurement of the accurate flowrate may be critical in industrial processes to ensure optimization of such industrial processes and flowrate measurement by the EM flowmeters. Hence, it is required to reduce the flow distortion in the EM flowmeter for reducing adverse impact on industrial processes.

BRIEF SUMMARY OF THE INVENTION

The present disclosure provides a method and a system for operating an Electromagnetic (EM) flowmeter for improving measurements during flow distortion of fluid in a flow pipe, in accordance with various embodiments. The distortion in the flow pipe is for instance, is at least upstream or downstream of EM flowmeter such as, bends, T joints and the like. The EM flowmeter includes a pair of coils including a top coil (C1) and a bottom coil (C2) powered by currents for generating electromagnetic fields, and a pair of electrodes for measuring electromotive forces generated by the interaction of electromagnetic and flow fields in the fluid. The EM flowmeter is communicably coupled to a system for measuring signals from the pair of electrodes. In order to improve the measurements during flow distortion of fluid in the flow pipe, the method includes configuring the current in the pair of coils (C1, C2) based on a relation between distance of the flowmeter from a flow distorting feature in the flow pipe and a characteristic length of the flowmeter. Further, the method includes measuring signals due to electromotive forces generated by the interaction of electromagnetic and flow fields based on the configuration of the current in the pair of coils (C1, C2). Based on the measured signals, the method includes estimating a flowrate of the fluid in the flow pipe.

BRIEF DESCRIPTION OF THE SEVERAL VIEWS OF THE DRAWING(S)

Figure 3A:
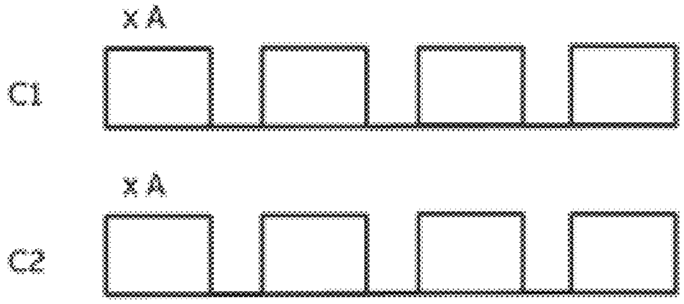
Figure 3B:
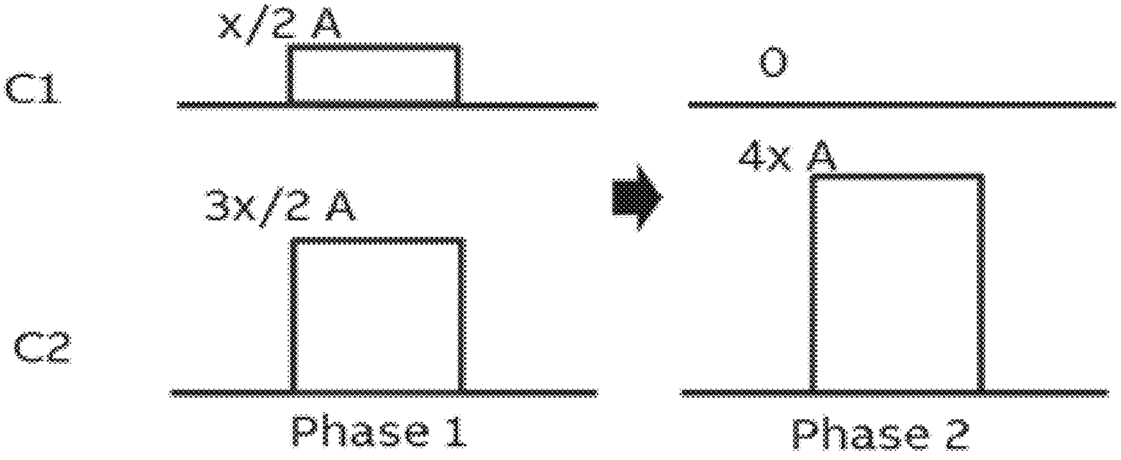
Figure 3C:
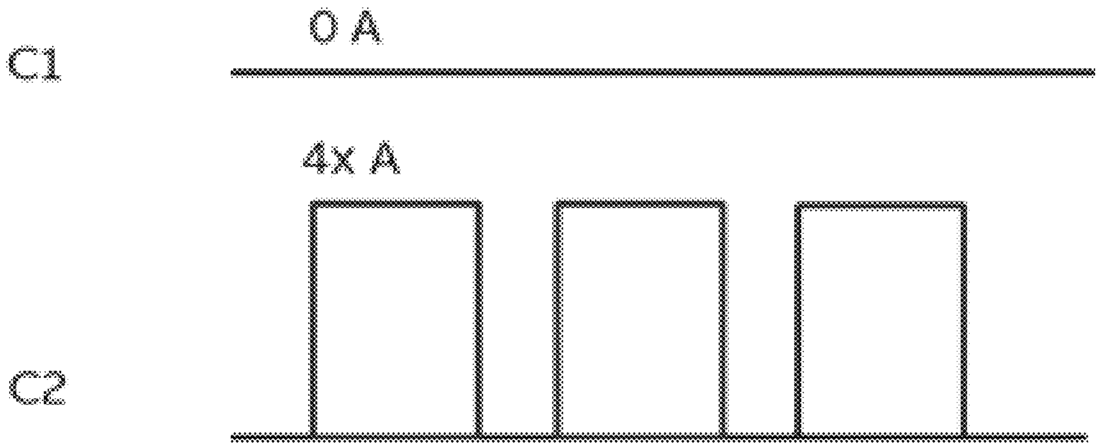

FIGS. 3A, 3B, and 3C illustrate graphical representations for showing coil powering patterns of electromagnetic flowmeter, in accordance with an alternative embodiment of the disclosure.

Figure 4:
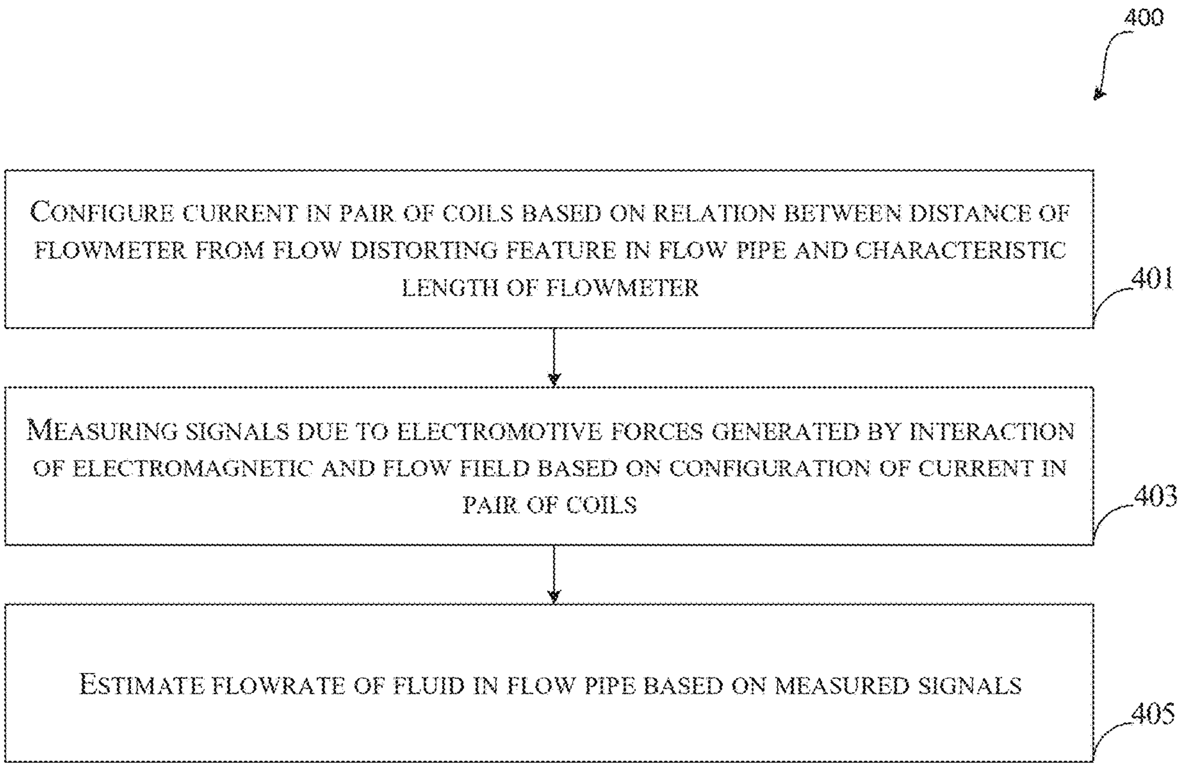

FIG. 4 is a flowchart of a method for operating an electromagnetic flowmeter for improving measurements during flow distortion of fluid in a flow pipe, in accordance with an embodiment of the invention.

DETAILED DESCRIPTION OF THE INVENTION

In the following description, for purposes of explanation, numerous specific details are set forth in order to provide a thorough understanding of the present disclosure. It will be apparent, however, to one skilled in the art that the present disclosure can be practiced without these specific details. In other instances, apparatus and methods are shown in block diagram form only in order to avoid obscuring the present disclosure.

Reference in this specification to “one embodiment” or “an embodiment” means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Some embodiments of the present disclosure will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. The use of any term should not be taken to limit the spirit and scope of embodiments of the present invention.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

A method, system and an electromagnetic (EM) flowmeter for operating an electromagnetic flowmeter for improving measurements during flow distortion of fluid in a flow pipe are provided herein in accordance with example embodiments. The method, system and the EM flowmeter disclosed herein provide measures to improve measurements in the EM during flow distortion of fluid though the flow pipe for ensuring generation of accurate flowrate which may be critical for various industrial processes, such as, but not limited to, water treatment plants, oil plants and pharmaceutical industries.

Figure 1A:
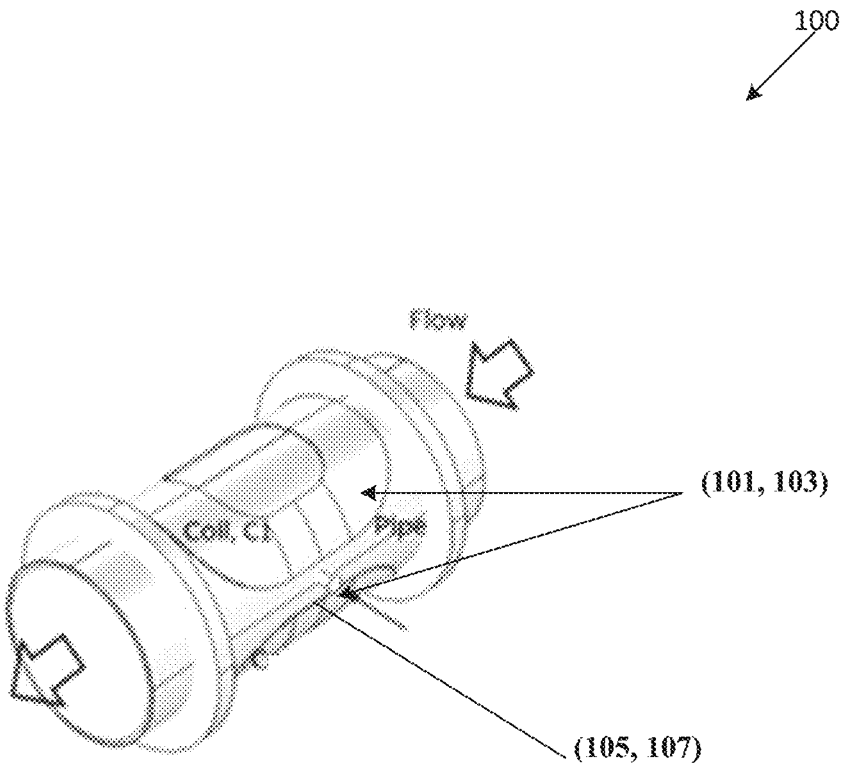
FIG. 1A illustrates a schematic diagram of an exemplary electromagnetic flowmeter, in accordance with an embodiment of the disclosure.

Referring to FIG. 1A, an exemplary electromagnetic (EM) flowmeter 100 suitable for measuring a flow rate of a fluid in a flow pipe is shown. In an embodiment, the EM flowmeter 100 works on Faraday's law of electromagnetic induction. The EM flowmeter 100 comprises a pipe with an insulative liner (not shown in FIG. 1A) inside the pipe and in contact with the fluid in the pipe. On either side, the EM flowmeter 100 includes a pair of coils, including a top coil C1 (101) and a bottom coil C2 (103) which are powered by currents for generating electromagnetic fields. Essentially, the generated electromagnetic field interacts with fluid velocity and induces an electromotive force (EMF) within the fluid domain. To measure the EMF, the EM flowmeter 100 includes on either side, a pair of electrodes (105, 107). In an embodiment, the EM flowmeter 100 may comprise a display for indicating the determined flow of fluid in the flow pipe.

Figure 1B:
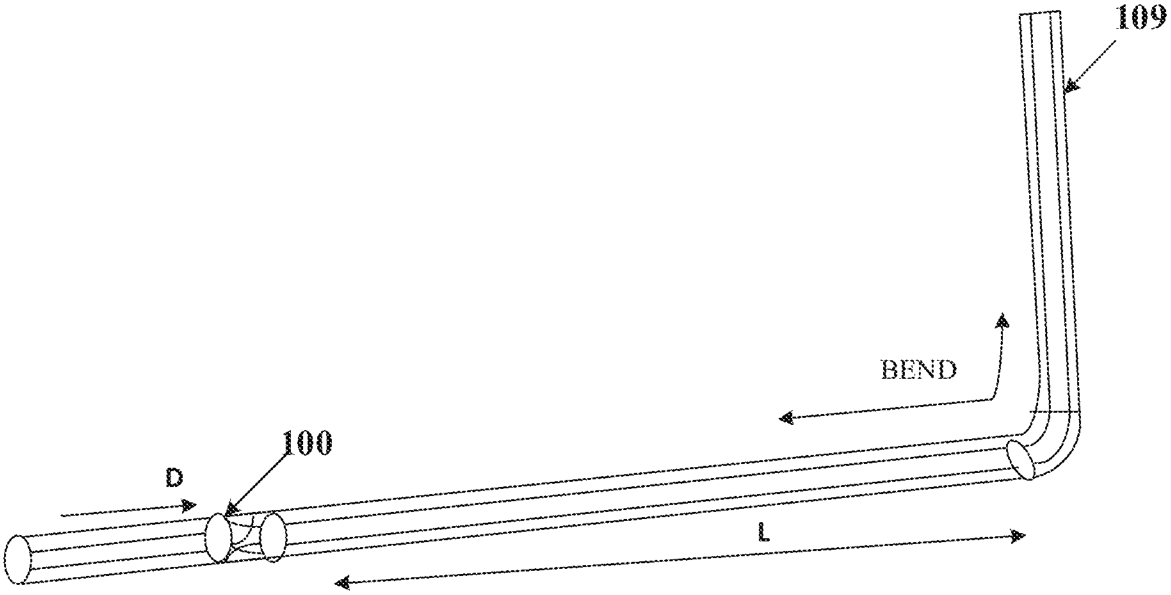
FIGS. 1B-1C illustrate a section of flow pipe with an electromagnetic flowmeter of FIG. 1, near a bend in accordance with an embodiment of the disclosure.

Generally, being proportional to velocity or flowrate, the measured EMF can be used to estimate the flowrate, by referring to a calibration factor provided during laboratory testing. The calibration factor is or directly related to a ratio of induced EMF/velocity obtained under ideal laboratory conditions, where enough pipe length upstream of the flowmeter is ensured to avoid flow distortion. However, in fields, there may be situations where an existing EM flowmeter may be near to an upstream or downstream bend and may undergo distortion, resulting in flow measurement error. This is illustrated in FIG. 1B, which shows a section of a flow pipe 109 with the electromagnetic flowmeter which is near the upstream bend. In an embodiment, a distance (of the EM flowmeter 100 from the bend is denoted in terms of multiples of its pipe internal diameter (D).

Figure 2:
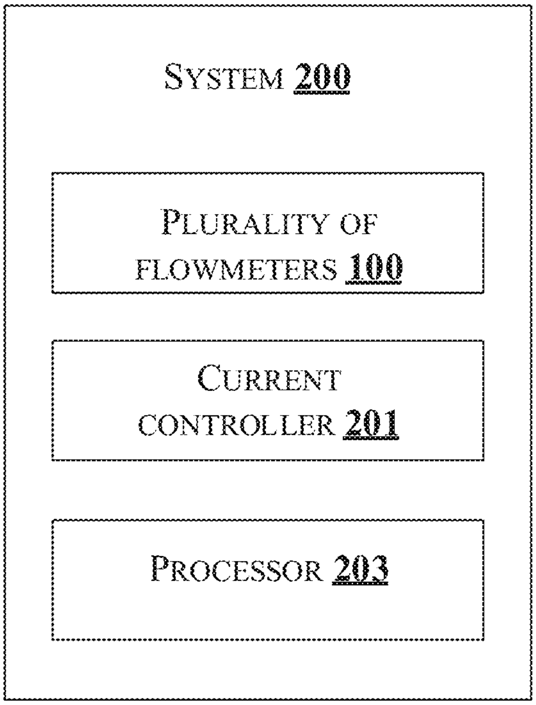
FIG. 2 illustrates a system for operating an electromagnetic flowmeter for improving measurements during flow distortion of fluid in a flow pipe, in accordance with an embodiment of the disclosure.

Since a signal obtained from the EM flowmeter 100 depends on a velocity distribution, any flow distortion feature in a velocity profile or distribution leads to error in measurement. The flow distorting feature in the flow pipe 109 is at least upstream or downstream of EM flowmeter 100 at pipe junctions such as, bends, T Joints, and the like. To overcome these flow distorting features, the present disclosure operates the EM flowmeter 100 by facilitating power to the pair of coils (101, 103) based on a unique pattern depending on number of factors. The EM flowmeter 100 is communicatively coupled to a system, as shown in FIG. 2 for measuring signals from the pair of electrodes and generating the flowrate of the EM flowmeter 100. The system configures the current in the pair of coils (C1, C2) (101, 103) based on a relation between distance of the EM flowmeter 100 from the flow distorting feature in the flow pipe 109 and a characteristic length (L) of the EM flowmeter 100, as shown in FIG. 1B. Typically, when the distance of the EM flowmeter 100 from the flow distorting feature is at first predefined times the characteristic length (L) of the EM flowmeter 100, the pair of coils (101, 103) is biased with a first current value, for instance, X amperes. In an embodiment, the first predefined times indicates twice the characteristic length (L) of the EM flowmeter 100. FIG. 3A illustrates a graphical representation for the above coil powering scheme the EM flowmeter 100. As shown in FIG. 3A, both C1 (101) and C2 (103) are configured with same first current value of X amperes.

Returning to FIG. 1A, consider a situation, when the distance of the EM flowmeter 100 from the flow distorting feature is of a second predefined times the characteristic length of the EM flowmeter 100. The second predefined times of distance is within the characteristic length (L) of the EM flowmeter 100. That is, for instance, distance of the EM flowmeter 100 from the bend is "0 to 1" time the diameter of the flow pipe 109 (0D to 1D). In such case, the system configures the current to the pair of coil (101, 103) at a predefined duration, for instance, "t" seconds, in an alternative repeating a first phase and a second phase. For instance, in the first phase, the top coil (C1) (101) is biased with half of the first current value and the bottom coil (C2) (103) with three times that of the top coil (C1). In other words, based on the above representation, the top coil (C1, 101) is at X/2 amperes and the bottom coil (C2, 103) is at 3X/2 amperes in the first phase. After the predefined duration or "t" seconds, the second phase is initiated for "t" seconds, where the current to the top coil (C1, 101) is deactivated and the bottom coil (C2, 103) is biased with four times that of the first current value.

Figure 1C:
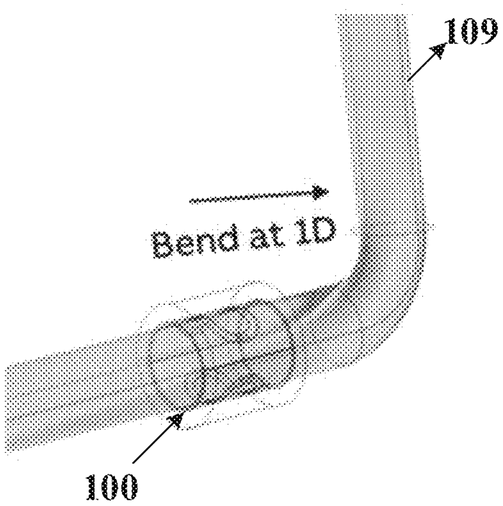

In other words, the top coil (C1, 101) is at zero amperes and the bottom coil (C2, 103) is at 4X amperes in the second phase. FIG. 3B illustrates a graphical representation for the above coil powering scheme of the EM flowmeter 100. As shown in FIG. 3B, the first phase (phase 1) and the second phase (phase 1) are depicted based on the current configuration. Essentially, signals obtained from the first phase and the second phase are averaged for further processing. FIG. 1C illustrate a section of flow pipe 109 with an electromagnetic flowmeter with bend at 1D. Likewise, consider another bend situation, when the distance of the EM flowmeter 100 from the flow distorting feature is third predefined times the characteristic length (L) of the EM flowmeter 100.

In an embodiment, the third predefined times of distance is between the characteristic length (L) of the EM flowmeter 100 and twice the characteristic length of the EM flowmeter 100. In other words, the distance between the EM flowmeter 100 and the bend is greater than 1D but less than 2D. In such condition, the configuration of current is such that, the current to the top coil (C1, 101) is deactivated and the bottom coil (C2, 103) is biased with four times of the first current value. That is, the C1 (101) is at zero amperes while C2 103 is at 4X amperes, as shown in FIG. 3C..

Returning to FIG. 1A, once the current is provided to the pair of coils (101, 103) based on any of the above-described configuration, signals due to electromotive forces generated by the interaction of electromagnetic fields and flow field are measured and a flowrate of the fluid in the flow pipe 109 is estimated based on the measured signals. The flowrate of the fluid may be estimated as per known techniques in the art. Thus, by configuring the current to the pair of coils (101, 103), based on the above relations ensure errors associated with distortion are reduced to an acceptable minimum. Also, since the present invention merely requires modification to coil current configuring, the present invention eliminates requirement of additional hardware to the EM flowmeter 100.

FIG. 2 shows a block diagram representation of a system 200 for operating an electromagnetic flowmeter for improving measurements during flow distortion for fluid in a flow pipe. The system 200 comprises at least one EM flowmeter 100, as described in FIG. 1A, a current controller 201 and a processor 203. The current controller 201 configures the current to the pair of coils (101, 103) of the EM flowmeter 100 based on the relation between distance of the EM flowmeter 100 from the flow distorting feature and characteristic length of the EM flowmeter 100. The current controller 201 includes details about location of each EM flowmeter 100 located in the flow pipe 109. That is, each EM flowmeter 100 is located at specific distance from the flow pipe 109 based on which a bend may be detected and the configuration of current to the pair of coils (101, 103) is varied. Accordingly, depending on the relation determined based on the details of each EM flowmeter 100, the current controller 201 may configure the current to the pair of coils (101, 103).

That is, for instance, when the distance of the EM flowmeter 100 from the bend is "0 to 1" time the diameter of the flow pipe 109 (0D to 1D), in such case, the current controller 201 configures the current to the pair of coil (101, 103) at the predefined duration, in an alternative repeating a first phase and a second phase. The current controller 201 configures the top coil (C1, 101) with X/2 amperes and the bottom coil (C2, 103) with 3X/2 amperes in the first phase. After the predefined duration or "t" seconds, in the second phase, the current controller 201 configures the top coil (C1, 101) with zero amperes and the bottom coil (C2, 103) with 4X amperes. In another bend relation, when the distance between the EM flowmeter 100 and the bend is greater than 1D but less than 2D, in such condition, the current controller 201 configures the top coil (C1, 101) with zero amperes while C2 103 with 4X amperes.

Further, the processor 203 is configured to measure the signals from the pair of electrodes (105, 107) due to the electromotive forces generated by the interaction of electromagnetic fields and the fluid field based on the configuration provided by the current controller 201. Based on the measured signals, the processor 203 estimates the flowrate of the fluid in the flow pipe 109.

FIG. 4 shows a flowchart of a method for operating an electromagnetic flowmeter for improving measurements during flow distortion of fluid in a flow pipe, in accordance with an embodiment of the invention.

The EM flowmeter 100 is communicatively coupled to the system 200 for operating and improving measurements during flow distortion of fluid in a flow pipe. The steps of the method 400 are performed by the system 200 which may include at least one EM flowmeter 100.

The method 400 comprises a first step 401 of configuring the current in the pair of coils (101, 103) based on the relation between distance of the EM flowmeter 100 from the flow distorting feature in the flow pipe 109 and the characteristic length (L) of the EM flowmeter 100.

Consider, in a first situation, when the distance of the EM flowmeter 100 from the flow distorting feature is at the first predefined times the characteristic length (L) of the EM flowmeter 100, the pair of coils (101, 103) is biased with the first current value, for instance, X amperes. In an embodiment, the first predefined times indicates twice the characteristic length (L) of the EM flowmeter 100.

Considering a second situation, when the distance of the EM flowmeter 100 from the flow distorting feature is of the second predefined times the characteristic length of the EM flowmeter 100. The second predefined times of distance is within the characteristic length (L) of the EM flowmeter 100. That is, for instance, distance of the EM flowmeter 100 from the bend is "0 to 1" time the diameter of the flow pipe 109 (0D to 1D). In such case, the current to the pair of coils (101, 103) is configured at a predefined duration in an alternative repeating a first phase and a second phase. For instance, in the first phase, the top coil (C1) (101) is biased with half of the first current value and the bottom coil (C2) (103) with three times that of the top coil (C1). In other words, based on the above representation, the top coil (C1, 101) is at X/2 amperes and the bottom coil (C2, 103) is at 3X/2 amperes in the first phase. After the predefined duration or "t" seconds, the second phase is initiated for "t" seconds, where the current to the top coil (C1, 101) is deactivated and the bottom coil (C2, 103) is biased with four times that of the first current value.

Likewise, considering third situation, when the distance of the EM flowmeter 100 from the flow distorting feature is the third predefined times the characteristic length (L) of the EM flowmeter 100.

The third predefined times of distance is between the characteristic length (L) of the EM flowmeter 100 and twice the characteristic length of the EM flowmeter 100. In such condition, the configuration of current is such that, the current to the top coil (C1, 101) is deactivated and the bottom coil (C2, 103) is biased with four times of the first current value. That is, the C1 (101) is at zero amperes while C2 103 is at 4X amperes.

In the next step, at 403, signals due to electromotive forces generated by the interaction of electromagnetic and fluid fields based on the configuration of the current in the pair of coils (101, 103) are measured. When the current in the pair of coils (101, 103) is based on the above second situation, the signals are measured by considering the average of signals of the first phase and the second phase.

In step 405, the flowrate of the fluid in the flow pipe 109 is estimated based on the measured signals. The calculation of the flow rate based on the measured signals may be assumed as per known techniques to the person skilled in the art.

With the configuration of current based on the above relations, the error due to flow distortion are dropped, for instance, nearly 40 times, due to the modification in powering pattern of the pair of coils (101, 103).

An embodiment of the present disclosure provides a low cost, non-invasive technique to ensure flow distortion independence.

An embodiment of the present disclosure ensures reliable and accurate flow sensors which is capable of high performance under extreme conditions.

An embodiment of the present disclosure ensures flow profile independence without inducing pressure drop or additional energy expenditure.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims.

Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

In accordance with the embodiment, the pair of coils (C1, C2) is biased with a first current value, when the distance of the flowmeter from the flow distorting feature is at first predefined times the characteristic length of the flowmeter. In an embodiment, the first predefined times is twice the characteristic length of the flowmeter.

In accordance with the embodiment, when the distance of the flowmeter from the flow distorting feature is of a second predefined times the characteristic length of the flowmeter, the current to the pair of coils is configured for a predefined duration in an alternative repeating first phase and a second phase. In the first phase, the top coil (C1) is biased with half of a first current value and the bottom coil (C2) with three times that of the top coil (C1). In the second phase, the current to the top coil (C1) is deactivated and the bottom coil (C2) is biased with four times that of the first current value.

In accordance with the embodiment, the second predefined times of distance is within the characteristic length of the flowmeter.

In accordance with the embodiment, when the distance of the flowmeter from the flow distorting feature is third predefined times the characteristic length of the flowmeter, the current to the top coil (C1) is deactivated and the bottom coil (C2) is biased with four times of a first current value.

In accordance with the embodiment, the third predefined times of distance is between the characteristic length of the flowmeter and twice the characteristic length of the flowmeter.

An embodiment of the present disclosure discloses the system for operating the EM flowmeter for improving measurements during flow distortion of fluid in a flow pipe. Without limiting the scope of the invention, the system is capable of operating the EM flowmeter such that an accurate and acceptable fluid flow rate data is generated. The system includes at least one flowmeter comprising a pair of coils with a top coil (C1) and a bottom coil (C2) which are exposed to a current for generating electromagnetic fields and a pair of electrodes for measuring electromotive forces generated by the interaction of electromagnetic fields in the fluid. The system includes a current controller for configuring the current to the pair of coils (C1, C2) based on a relation between distance of the flowmeter from a flow distorting feature and characteristic length of the flowmeter. By providing a unique combination of coil powering patterns, based on a relation between distance of the flowmeter from a flow distorting feature and characteristic length of the flowmeter, the system minimizes flow distortion and induced errors. Further, the system includes a processor configured to measure signals from the pair of electrodes due to electromotive forces generated by the interaction of electromagnetic and flow fields based on the configuration of the current in the pair of coils (C1, C2) and estimate a flowrate of the fluid in the flow pipe based on the measured signals.

Another embodiment of the present disclosure discloses an electromagnetic flowmeter for improving measurements during flow distortion for fluid in a flow pipe. The electromagnetic flowmeter comprises a pair of coils comprising a top coil (C1) and a bottom coil (C2) which are exposed to a current received from a system for generating electromagnetic fields and flow field. The current is based on a relation between distance of the flowmeter from a flow distorting and characteristic length of the flowmeter. Further, the electromagnetic flowmeter comprises a pair of electrodes for measuring electromotive forces generated by the interaction of electromagnetic and flow fields in the fluid. The signals due to electromotive forces are generated by the interaction of electromagnetic fields based on the configuration of the current in the pair of coils (C1, C2) for estimating a flowrate of the fluid in the flow pipe.

All references, including publications, patent applications, and patents, cited herein are hereby incorporated by reference to the same extent as if each reference were individually and specifically indicated to be incorporated by reference and were set forth in its entirety herein.

The use of the terms “a” and “an” and “the” and “at least one” and similar referents in the context of describing the invention (especially in the context of the following claims) are to be construed to cover both the singular and the plural, unless otherwise indicated herein or clearly contradicted by context. The use of the term “at least one” followed by a list of one or more items (for example, “at least one of A and B”) is to be construed to mean one item selected from the listed items (A or B) or any combination of two or more of the listed items (A and B), unless otherwise indicated herein or clearly contradicted by context. The terms “comprising,” “having,” “including,” and “containing” are to be construed as open-ended terms (i.e., meaning “including, but not limited to,”) unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of operating an electromagnetic flowmeter for improving measurements during flow distortion of fluid in a flow pipe, the electromagnetic flowmeter comprising a pair of coils including a top coil and a bottom coil which are powered by currents for generating electromagnetic fields, and a pair of electrodes for measuring electromotive forces generated by an interaction of electromagnetic and flow fields in the fluid, wherein the electromagnetic flowmeter is communicably coupled to a system for measuring signals from the pair of electrodes, the method comprising:

receiving a pre-measured distance of the electromagnetic flowmeter from a flow distorting feature in the flow pipe, wherein the pre-measured distance is a multiple of a diameter of the flow pipe ranging from 0 to two times the diameter of the flow pipe;

calibrating, by the system, the current in the pair of coils based on the multiple of the diameter of the flow pipe, configuring the current in the pair of coils differently for a first multiple of the diameter, a second multiple of the diameter, and a third multiple of the diameter;

measuring, by the system, signals due to electromotive forces generated by the interaction of electromagnetic and flow fields based on the configuration of the current in the pair of coils; and estimating, by the system, a flowrate of the fluid in the flow pipe based on the measured signals.

2. The method as claimed in claim 1, wherein the flow distorting feature in the flow pipe is one of upstream or downstream of the electromagnetic flowmeter.

3. The method as claimed in claim 1, further comprising calibrating the current in the pair of coils with a first current value based on the pre-measured distance being the first multiple of the diameter.

4. The method as claimed in claim 3, wherein the first multiple of the diameter is twice the diameter of the flow pipe.

5. The method as claimed in claim 1, further comprising calibrating the current in the pair of coils for a predefined duration in an alternative repeating first phase and a second phase, wherein in the first phase, the top coil is biased with half of a first current value and the bottom coil with three times that of the top coil, and in the second phase, the current to the top coil is deactivated and the bottom coil is biased with four times that of the first current value based on the pre-measured distance being the second multiple of the diameter.

6. The method as claimed in claim 5, wherein the second multiple of the diameter is 0 to 1 times the diameter of the flow pipe.

7. The method as claimed in claim 1, further comprising calibrating the current to the top coil to be deactivated and the bottom coil is biased with four times of a first current value for the third multiple of the diameter.

8. The method as claimed in claim 7, wherein the third multiple of the diameter is between 1 and 2 times diameter of the flow pipe.

9. A system for operating an electromagnetic flowmeter for improving measurements during flow distortion for fluid in a flow pipe, the system comprising:

at least one electromagnetic flowmeter comprising a pair of coils that includes a top coil and a bottom coil, which are exposed to a current for generating electromagnetic fields; and a pair of electrodes for measuring electromotive forces generated by an interaction of electromagnetic and flow fields in the fluid;

a current controller configured to receive a pre-measured distance of the electromagnetic flowmeter from a flow distorting feature in the flow pipe, wherein the pre-measured distance is a multiple of a diameter of the flow pipe ranging from 0 to two times the diameter of the flow pipe;

the current controller further configured to calibrate the current to the pair of coils based on the multiple of the diameter of the flow pipe, the current controller adapted to configure the current in the pair of coils differently for a first multiple of the diameter, a second multiple of the diameter, and a third multiple of the diameter; and a processor configured to measure signals from the pair of electrodes due to electromotive forces generated by the interaction of electromagnetic and flow fields based on the configuration of the current in the pair of coils and estimate a flowrate of the fluid in the flow pipe based on the measured signals.

10. An electromagnetic flowmeter for improving measurements during flow distortion for fluid in a flow pipe, the electromagnetic flowmeter comprising:

a current controller configured to receive a pre-measured distance of the electromagnetic flowmeter from a flow distorting feature in the flow pipe, wherein the pre-measured distance is a multiple of a diameter of the flow pipe ranging from 0 to two times the diameter of the flow pipe;

a pair of coils comprising a top coil and a bottom coil that are exposed to a current received from a system for generating electromagnetic fields, wherein the current to the pair of coils is based on the multiple of the diameter of the flow pipe, the current controller adapted to configure the current in the pair of coils differently for a first multiple of the diameter, a second multiple of the diameter, and a third multiple of the diameter; and a pair of electrodes for measuring electromotive forces generated by an interaction of electromagnetic and flow fields in the fluid, wherein signals due to electromotive forces are generated by the interaction of electromagnetic and flow fields based on the configuration of the current in the pair of coils for estimating by the system a flowrate of the fluid in the flow pipe.

* * * * *